Oct. 10, 1967  D. M. ROWSE  3,346,081
MEANS FOR STOPPING THE TRACTOR TRANSMISSION GEAR
TRAIN UPON DISENGAGEMENT OF THE CLUTCH
Filed Nov. 19, 1965  2 Sheets-Sheet 1

INVENTOR.
DEAN M. ROWSE
BY
Zarley, McKee & Thomte
ATTORNEYS

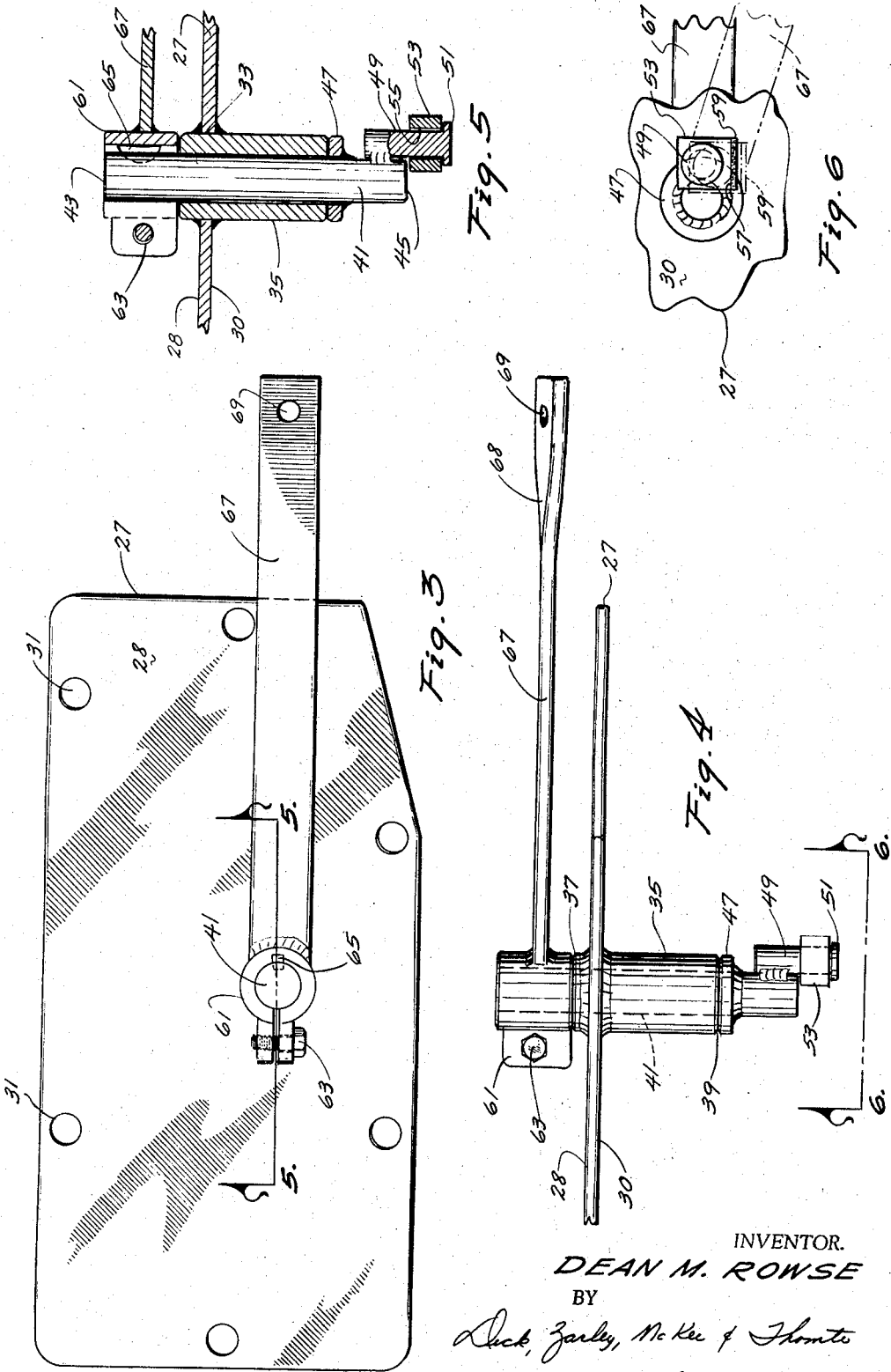

United States Patent Office 3,346,081
Patented Oct. 10, 1967

3,346,081
MEANS FOR STOPPING THE TRACTOR TRANSMISSION GEAR TRAIN UPON DISENGAGEMENT OF THE CLUTCH
Dean M. Rowse, Ewing, Nebr. 68735
Filed Nov. 19, 1965, Ser. No. 508,730
3 Claims. (Cl. 192—3.5)

This invention relates to an attachment for a tractor and more particularly to an attachment designed to stop the tractor transmission gear train from running when the clutch is disengaged.

Obviously, the tractor transmission rotates or runs when the clutch is engaged. The clutch will be disengaged when it is desired to shift from one gear to another. However, the rotation of the transmission gear train does not stop simultaneously with the disengagement of the clutch due to the inertia of the rotating gear train. This is especially true when the tractor has been operated for some time thereby causing the oil in the transmission to be hot and less viscous than when it is cool. The low viscosity transmission oil offers very little resistance to the rotating gear train and as a result, the gear train continues to rotate for some time after the clutch has been disengaged. This means that the transmission cannot be shifted until the rotation of the gear train has stopped and thereby prevents rapid shifting of the transmission.

The gear train continues to run for a considerable length of time after disengagement of the clutch in those tractors equipped with a "torque amplifier" such as International Harvestor Models 460 and 560 due to the physical characteristics of the torque amplifiers.

Many farms tractors are equipped with a hydraulically powered loader bucket at the front end thereof. The hydraulic system of the loader buckets are in fluid communication with the transmission, or in other words, the same oil is used for lubricating the transmission and for operating the loader bucket. The hydraulic system of the loader bucket demands that a light weight oil be used. This means that a light weight oil, offering very little resistance to the rotating gear train, must also be used in the transmission.

Rapid shifting is a necessity when the tractor is being used as a loader means and is also important in conventional field operation. Rapid shifting has not heretofore been possible in those situations outlined above without "grinding" the gears.

Therefore, it is a principal object of this invention to provide an attachment for a tractor or the like which stops the rotation of the transmission gear train simultaneously with the disengagement of the clutch thereof.

A further object of this invention is to provide an attachment for a tractor or the like which permits rapid shifting thereof.

A further object of this invention is to provide an attachment for a tractor which stops the rotation of the transmission gear train simultaneously with the disengagement of the clutch thereof and which is especially adaptable to those tractors having torque amplifiers provided thereon.

A further object of this invention is to provide an attachment for a tractor which is easily and quickly installed thereon.

A further object of this invention is to provide an attachment for a tractor which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 3 is a top elevational view of the device;

FIG. 4 is a side elevational view of the device;

FIG. 5 is a cut away view of the device as would be seen on line 5—5 of FIG. 3 with portions thereof cut away to more fully illustrate the invention; and FIG. 6 is a bottom view of the device as would be seen on line 6—6 of FIG. 4 with broken lines indicating the position to which certain of the structure is moved in the operation of the device.

Figure 2:
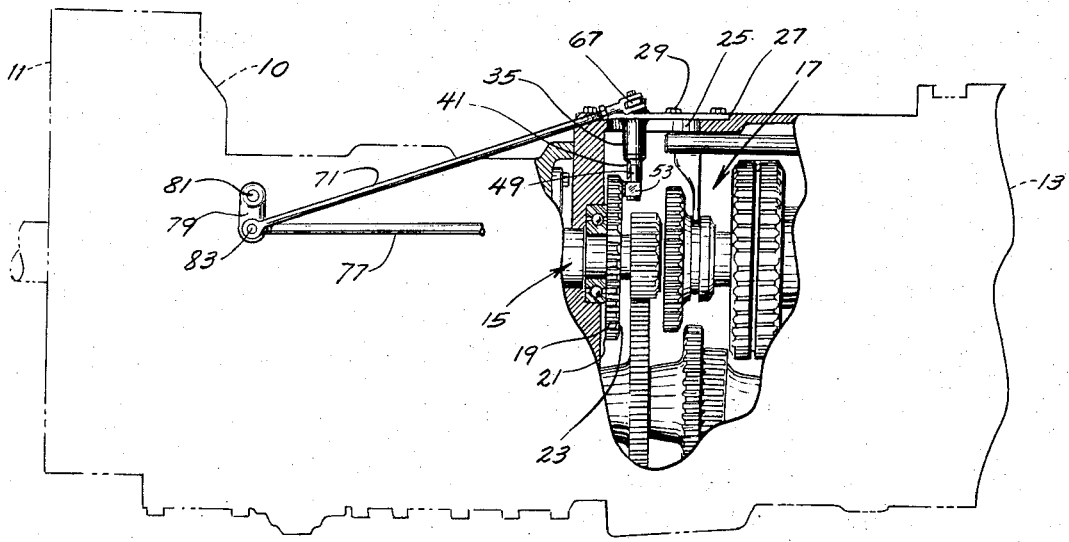
FIG. 2 is a side view of the tractor transmission housing with a portion thereof cut away to more fully illustrate the invention.

The numeral 10 is FIG. 2 generally designates the conventional tractor transmission housing having a forward end 11 and a rearward end 13. A transmission gear train is positioned in housing 10 and includes a torque amplifier means generally indicated by the reference numeral 17. Torque amplifier means 17 includes a rotatable gear 19 having a forward surface 21 and a rearward surface 23. Housing 10 is provided with an access opening 25 in the top thereof into which the instant invention is mounted.

The numeral 27 generally designates a flat plate having a top surface 28 and a bottom surface 30 which is adapted to be secured to housing 10 at access opening 25 by means of bolt assemblies 29 extending through openings 31 in plate 27 and into housing 10.

Plate 27 is provided with an opening 33 formed therein adapted to receive a hollow collar 35 extending therethrough having an upper end 37 and a lower end 39. Collar 35 is welded to plate 27 as illustrated in FIG. 5 so that the majority of its length extends below plate 27. A shaft 41 is rotatably mounted in collar 35 and has an upper end 43 and a lower end 45. It can be seen in FIG. 5 that the upper end 43 of shaft 41 terminates at a point above the upper end of collar 35 and that the lower end 45 of shaft 41 terminates below the lower end of collar 35. As best seen in FIGS. 4–6, a washer 47 embraces shaft 41 and is welded thereto at a point below the lower end 39 of collar 35 to limit the upward vertical movement of shaft 41 with respect to collar 35.

Welded to one side of shaft 41 adjacent the lower end thereof is a shaft 49 which extends downwardly therefrom to a point below the lower end of shaft 41. Shaft 49 is provided with an enlarged head portion 51 as best seen in FIGS. 4 and 6. A block 53 having an opening 55 formed therein is rotatably mounted on shaft 49 and is provided with a gear engaging portion 57. If desired, gear engaging portion 57 of block 53 may be provided with a lining material 59 secured thereto by any convenient means. Lining material 59 may be comprised of any suitable material such as a brake lining material or the like.

A clamp means 61 embraces the exposed upper end of shaft 41 and is rigidly tightened thereon by means of bolt assemblies 63. If desired, the upper end of shaft 41 and the interior surface of clamp means 61 may be slotted to receive a key member 65 therein to further prevent rotation of clamp means 61 with respect to shaft 41. An arm member 67 is welded to clamp means 61 and extends outwardly therefrom substantially transversely to the longitudinal axis of shaft 41. The free end of arm members 67 is twisted at 68 as best illustrated in FIG. 4 and has an aperture 69 formed therein. As best seen in FIGS. 5 and 6, shaft 49 is positioned on shaft 41 directly below arm member 67.

Figure 1:
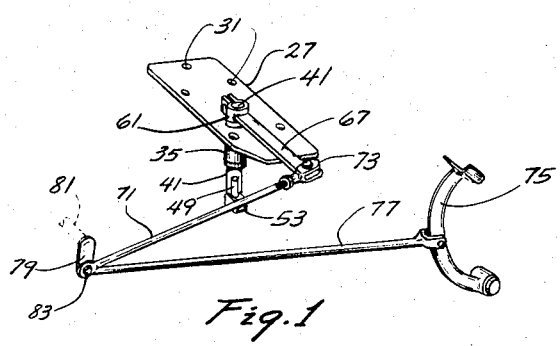
FIG. 1 is a perspective view of the device illustrating the operative connection thereto with the clutch mechanism.

A length adjustable link member 71 is pivotally connected at its rearward end to arm member 67 by means of pin 73 and extends forwardly, downwardly and outwardly therefrom. In FIG. 1, the numeral 75 generally designates the tractor clutch pedal which is pivotally connected at its lower end to the tractor. A clutch pedal lever 77 is pivotally connected to clutch pedal 75 and extends forwardly therefrom as best seen in FIG. 1. In FIG. 1, the numeral 79 generally designates the clutch throw-out lever which is operatively connected to the clutch means of the tractor by means of shaft 81 which rotates about a horizontal axis. The forward ends of link member 71 and clutch pedal lever 77 are pivotally connected to the lower end of clutch throw-out lever 79 by means of pin 83.

The normal method of operation is as follows. The plate which normally covers access opening 25 on housing 10 is first removed and may be replaced with plate 27 and the associated structure thereon if desired or the plate may be fabricated to correspond to plate 27 and its associated structure. Plate 27 is secured to housing 10 at access opening 25 by means of bolts 29. When plate 27 has been installed, the device would be positioned as seen in FIG. 2. Link member 71 would then be connected to clutch throw-out lever 79 as previously described.

When clutch pedal 75 is pivotally moved forwardly, clutch pedal lever 77 would also be moved forwardly to disengage the clutch means of the tractor in conventional fashion. The forward movement of clutch pedal 77 also causes link member 71 to be moved forwardly which causes arm member 67 to be pivoted forwardly. The forward pivotal movement of arm member 67 causes shaft 41 to be rotated in a clockwise direction as viewed in FIG. 3. This clockwise rotation of shaft 41 causes shaft 49 and block 53 to be moved forwardly as viewed in FIG. 2 into frictional engagement with the rearward surface 23 of gear 19. The frictional engagement of block 53 with gear 19 halts the rotation thereof and also stops the rotation or running of gear train 15 due to its operative connection therewith. This means that the rotation of the gear train will be halted immediately upon the disengagement of the clutch means to permit the operator to quickly shift into another "gear" without waiting for the gear train to quit running as is normally the situation in conventional tractors.

As soon as the operator has completed the shifting operation, the clutch means may be engaged by releasing the clutch pedal 75. The releasing of clutch pedal 75 causes clutch pedal lever 77 and link member 71 to be moved rearwardly. The rearward movement of link member 71 causes block 53 to disengage from its frictional engagement with gear 19.

The device is especially well adapted for use with International Harvester Models 460 and 560 which are equipped with the torque amplifier. However, the device can be used on other tractors as well and is not intended to be limited to those tractors identified above. In those tractors not equipped with torque amplifiers, it is simply necessary to slightly modify the device to cause block 53 to engage one of the various gears in the transmission.

Preferably, all of the elements of the device, with the exception of lining material 59, should be constructed of a suitable metal material such as steel or iron. When lining material 59 is not utilized, block 53 should be comprised of a bronze or the like material to prevent excessive wear on gear 19. Excessive wear on gear 19 is also substantially reduced due to the fact that block 53 is rotatably mounted on shaft 49 so that the entire gear engaging portion thereof will come into frictional engagement with gear 19.

Thus it can be seen that a unique and highly efficient means has been provided for stopping the rotation of the transmission gear train simultaneously with the disenagagement of the tractor clutch means. Therefore, it can be seen that the device accomplishes at least all of its stated objectives.

Some changes may be made in the construction and arrangement of my means for stopping the tractor transmission gear train upon disengagement of the clutch without departing from the real spirit and purpose of my invention, and it is my intention to cover by my claims, any modified forms of structure or use of mechanical equivalents which may be reasonably included within their scope.

I claim:
1. In an attachment for a tractor having a transmission including rotatable gears operatively mounted therein and a clutch means actuated by a clutch pedal adapted to disengage and engage the transmission at times, said transmission including an access opening at the upper end thereof,
   a cover element detachably mounted on said transmission closing said access opening,
   a hollow bearing means secured to and extending through said cover element and having inner and outer ends,
   a first shaft rotatably mounted in said bearing means and having its inner end protruding from the inner end of said bearing means and its outer end protruding from the outer end of said bearing means,
   a second shaft secured to the inner end of first shaft at one side thereof so that the longitudinal axis thereof is off-set from the longitudinal axis of said first shaft,
   a brake shoe rotatably mounted on said second shaft,
   an arm member operatively secured to the outer end of said first shaft, and
   a linkage means interconnecting said arm member and said clutch pedal whereby said brake shoe will be moved into frictional engagement with one of the gears in the transmission upon the clutch pedal being depressed thereby stopping the rotation of the gears in the transmission.

2. The attachment of claim 1 wherein said brake shoe is comprised of a block member having a lining means thereon to prevent wear of said brake shoe and said one gear and to increase the friction therebetween when said brake shoe and said one gear are in engagement with each other.

3. The attachment of claim 1 wherein said transmission includes a torque amplifier means and said brake shoe engages one of the gears in said torque amplifier at times.

References Cited

UNITED STATES PATENTS

| | | | |
|---|---|---|---|
| 1,784,354 | 12/1930 | Haussmann | 192—13 X |
| 1,843,145 | 2/1932 | Starkey et al. | 192—4 X |
| 1,975,626 | 10/1934 | Tibbetts | 192—13 X |
| 2,040,034 | 5/1936 | Tatter | 192—13 X |
| 2,104,608 | 1/1938 | Cox et al. | 192—13 X |
| 3,130,827 | 4/1964 | Beeskow | 192—13 |

HENRY F. RADUAZO, *Primary Examiner.*

ARTHUR T. McKEON, *Assistant Examiner.*